United States Patent
Tomita et al.

(10) Patent No.: US 7,219,757 B2
(45) Date of Patent: May 22, 2007

(54) MODE TRANSFER CONTROL APPARATUS AND METHOD FOR HYBRID VEHICLE

(75) Inventors: Yasushi Tomita, Yokohama (JP); Kiyoshi Akiyama, Yokohama (JP); Tomoya Imazu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 323 days.

(21) Appl. No.: 10/862,477

(22) Filed: Jun. 8, 2004

(65) Prior Publication Data
US 2004/0256165 A1 Dec. 23, 2004

(30) Foreign Application Priority Data
Jun. 23, 2003 (JP) .............................. 2003-178434

(51) Int. Cl.
*B60K 6/04* (2006.01)
(52) U.S. Cl. .................. 180/65.2; 180/65.3; 180/65.4; 180/65.7; 903/941; 903/942; 903/945
(58) Field of Classification Search .............. 180/65.1, 180/65.2, 65.3, 65.4, 65.6, 65.7; 903/941, 903/942, 945; 475/5; 318/34, 66
See application file for complete search history.

(56) References Cited

U.S. PATENT DOCUMENTS

| | | | |
|---|---|---|---|
| 6,348,771 B1* | 2/2002 | Morimoto et al. ........... | 318/139 |
| 6,726,592 B2 | 4/2004 | Kotani | |
| 6,852,053 B2* | 2/2005 | Nakano et al. ................ | 475/5 |
| 6,953,409 B2* | 10/2005 | Schmidt et al. ................ | 475/5 |
| 6,994,646 B2* | 2/2006 | Ai ................................ | 475/5 |
| 7,004,868 B2* | 2/2006 | Oshidari et al. ............... | 475/5 |
| 2003/0064847 A1* | 4/2003 | Oshidari et al. ............... | 475/5 |
| 2003/0069104 A1* | 4/2003 | Nakano et al. ................ | 475/5 |
| 2003/0073534 A1* | 4/2003 | Oshidari et al. ............... | 475/5 |
| 2004/0043856 A1* | 3/2004 | Xiaolan ......................... | 475/5 |

(Continued)

FOREIGN PATENT DOCUMENTS

JP 62-092352 U 6/1987

(Continued)

OTHER PUBLICATIONS

U.S. Appl. No. 10/816,273, filed Apr. 2, 2004, Shinichiro et al.

*Primary Examiner*—Christopher P. Ellis
*Assistant Examiner*—John Walters
(74) *Attorney, Agent, or Firm*—Foley & Lardner LLP

(57) ABSTRACT

In mode transfer control apparatus and method for a hybrid vehicle, in a state in which the vehicle is in at least one of a start state and a travel state and in one steady-state mode of a continuously variable transmission gear ratio mode and a fixed transmission gear ratio mode, a mode transfer to the other steady-state mode of the continuously variable transmission gear ratio mode and the fixed transmission gear ratio mode is inhibited in a case where a driving point of the vehicle determined according to a detection value of a vehicle speed and a calculation value of a target driving force is present within an overlap area on a steady-state mode area map in which both of a continuously variable transmission gear ratio mode and a fixed transmission gear ratio mode are selectable.

11 Claims, 6 Drawing Sheets

U.S. PATENT DOCUMENTS

2005/0064974 A1 * 3/2005 Bezian et al. ............ 475/5

FOREIGN PATENT DOCUMENTS

| JP | 02-241844 A | 9/1990 |
| JP | 2000-142146 A | 5/2000 |
| JP | 2003-034153 * | 2/2003 |
| JP | 2003-34153 A | 2/2003 |
| JP | 2003-34154 A | 2/2003 |
| JP | 2003-34155 A | 2/2003 |
| JP | 2003-104072 * | 4/2003 |
| JP | 2003-104072 A | 4/2003 |
| JP | 2003-130202 * | 5/2003 |
| JP | 2003-130202 A | 5/2003 |

* cited by examiner

EXPLANATION OF EV MODE

EXPLANATION OF EV-LB MODE

MODE TRANSFER CONTROL APPARATUS AND METHOD FOR HYBRID VEHICLE

BACKGROUND OF THE INVENTION

1. Field of the Invention

The present invention relates to a technical field of mode transfer control apparatus and method for a hybrid vehicle having a fixed transmission gear ratio mode by an engagement of an engagement element in addition of a continuously variable transmission gear ratio as a steady-state mode selected when the vehicle is started or traveled.

2. Description of the Related Art

A Japanese Patent Application First Publication No. 2003-34153 published on Feb. 4, 2003 exemplifies a previously proposed mode transfer control apparatus for a hybrid vehicle. In the above-described Japanese Patent Application First Publication, the hybrid vehicle to which a power train system as will be described below is applied is disclosed. In the power train system, a brake is installed on any one of revolutional elements of a differential gear unit constituted by, for example, a planetary gear mechanism having four or more elements and two degrees of freedom, an output to a drive system being allocated to one of the other revolutional elements of the differential gear unit. In this hybrid vehicle, in a state, for example, in which the vehicle is traveling at a certain speed, a mode transfer between an electric vehicle mode (so-called, EV mode) in which a continuously variable transmission gear ratio is achieved only by a drive of two motors and an electric vehicle-low brake mode (so-called, EV-LB mode) in which the vehicle is driven by means of the two motors at a fixed transmission gear ratio with a low brake engaged is carried out.

SUMMARY OF THE INVENTION

However, in the previously proposed mode transfer control apparatus disclosed in the above-described Japanese Patent Application First Publication, in a case where the mode transfer from EV mode to EV-LB mode occurs, the low brake is engaged under a state with a speed of the low brake not zeroed. At this time, as a result that a revolution speed of each revolutional element of the planetary gear train is forcibly modified, the speed of the low brake is zeroed. Hence, a variation of the speed of each element, namely, an acceleration of each element causes an inertia torque to be developed. Accordingly, a driving force shock of the vehicle occurs. Similarly, in a case of the mode transfer from EV-LB mode to EV mode, the driving force shock occurs due to a reaction force balance against an inertia force acted upon each element during a release of the brake.

It is, hence, an object of the present invention to provide mode transfer control apparatus and method for a hybrid vehicle which are capable of suppressing an occurrence frequency of the driving force shock by avoiding frequent mode transfers between the continuously variable transmission gear ratio mode and the fixed transmission gear ratio mode while determining (discriminating) an appropriate steady-state mode (or static mode) at a start state or a run (travel) state of the vehicle.

According to one aspect of the present invention, there is provided a mode transfer control apparatus for a hybrid vehicle, comprising: power sources including an engine and at least one motor; a differential gear transmission including a planetary gear train in which the respective power sources are linked with revolutional elements of the planetary gear train and at least one engagement element that is engaged to achieve a fixed transmission gear ratio from a state in which the engagement element is released to provide a continuously variable transmission function for the planetary gear train; a mode selecting section that selects one steady-state mode from modes of a continuously variable transmission gear ratio in which the engagement element is released and a fixed transmission gear ratio in which the engagement element is engaged; an engagement element controlling section that performs an engagement-and-release control for the engagement element during a mode transfer between the continuously variable transmission gear ratio mode and the fixed transmission gear ratio mode; a vehicle speed detecting section that detects a vehicle speed; a target driving force calculating section that calculates a target driving force of the vehicle; and a mode area map setting section that sets, according to the vehicle speed and the target driving force, a steady-state area map including a continuously variable transmission gear ratio mode area, a fixed transmission gear ratio mode area, and an overlap area in which both of the continuously variable transmission gear ratio mode area and the fixed transmission gear ratio mode area are overlapped with each other, the mode selecting section, in a state in which the vehicle is in at least one of a start state and a travel state and in one steady-state mode of the continuously variable transmission gear ratio mode and the fixed transmission gear ratio mode, inhibiting a mode transfer to the other steady-state mode of the continuously variable transmission gear ratio mode and the fixed transmission gear ratio mode in a case where a driving point of the vehicle determined according to a detection value of the vehicle speed and a calculation value of the target driving force is present within the overlap area in the steady-state mode area map in which both of the continuously variable transmission gear ratio mode and the fixed transmission gear ratio mode are selectable.

According to another aspect of the present invention, there is provided a mode transfer control method for a hybrid vehicle, the hybrid vehicle comprising: power sources including an engine and at least one motor; and a differential gear transmission including a planetary gear train in which the respective power sources are linked with revolutional elements of the planetary gear train and at least one engagement element that is engaged to achieve a fixed transmission gear ratio from a state in which the engagement element is released to provide a continuously variable transmission function for the planetary gear train, and the mode transfer control method comprising: selecting one steady-state mode from modes of a continuously variable transmission gear ratio in which the engagement element is released and a fixed transmission gear ratio in which the engagement element is engaged; performing an engagement-and-release control for the engagement element during a mode transfer between the continuously variable transmission gear ratio mode and the fixed transmission gear ratio mode; detecting a vehicle speed; calculating a target driving force of the vehicle; and setting a steady-state area map including a continuously variable transmission gear ratio mode area, a fixed transmission gear ratio mode area, and an overlap area in which both of the continuously variable transmission gear ratio mode area and the fixed transmission gear ratio mode area are overlapped with each other according to the detected vehicle speed and the calculated target driving force, at the mode selection, in a state in which the vehicle is in at least one of a start state and a travel state and in one steady-state mode of the continuously variable transmission gear ratio mode area and the fixed transmission gear ratio mode area, a mode transfer to the other steady-state mode of the continuously variable transmission gear ratio mode and the fixed transmission gear ratio mode is inhibited in a case where a driving point of the vehicle determined according to a detection value of the vehicle speed and a calculation value of a target driving force is present within the overlap area in which both of the continuously variable transmission gear ratio mode and the fixed transmission gear ratio mode are selectable.

This summary of the invention does not necessarily describe all necessary features so that the present invention may also be sub-combination of these described features.

DETAILED DESCRIPTION OF THE PREFERRED EMBODIMENT

Reference will hereinafter be made to the drawings in order to facilitate a better understanding of the present invention.

[Hybrid System Configuration]

Figure 1:
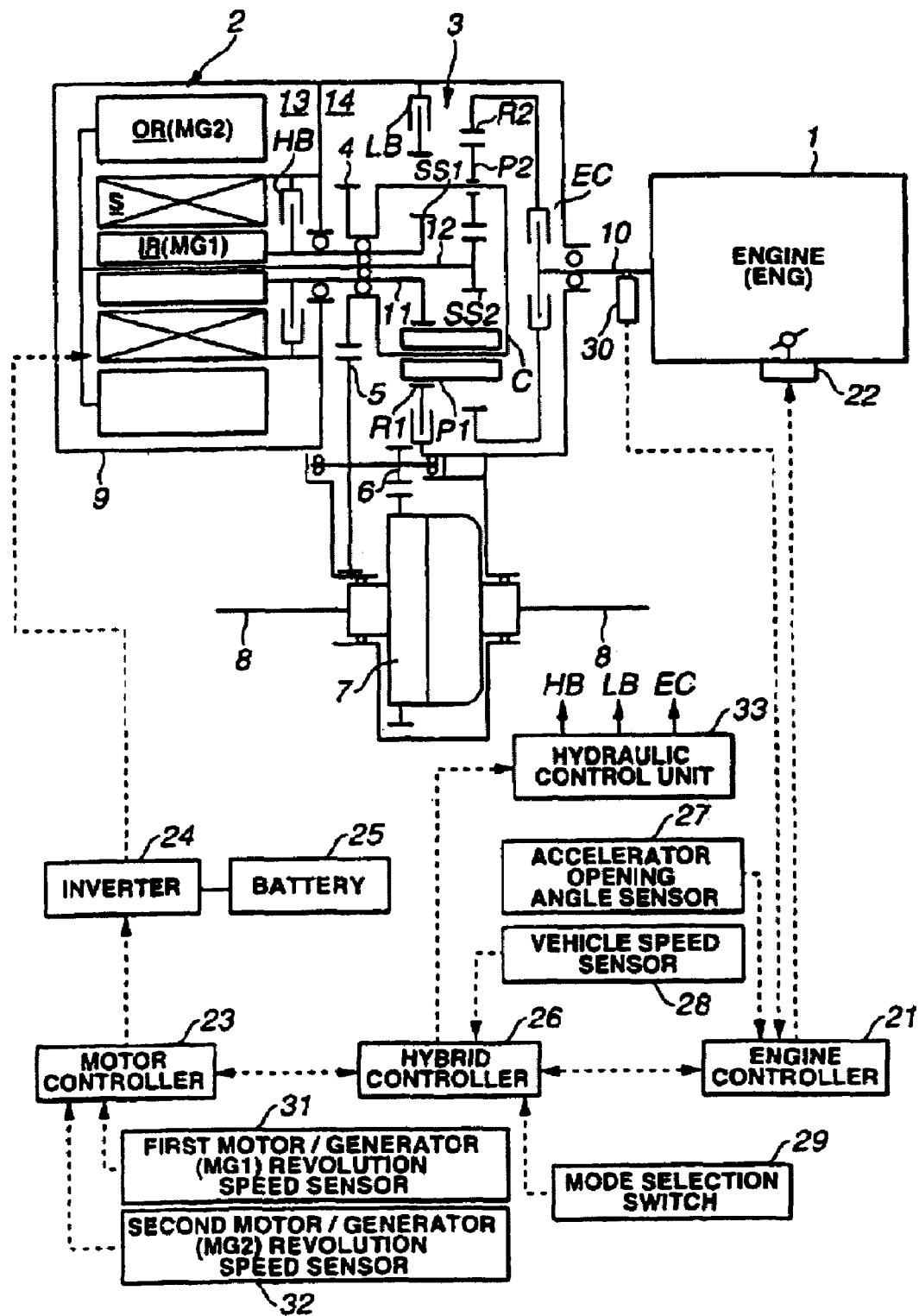
FIG. 1 is a configuration view of a hybrid (vehicle) system to which a mode transfer control apparatus in a preferred embodiment according to the present invention is applicable.

FIG. 1 shows a whole configuration of a hybrid (vehicle) system to which a mode transfer control apparatus in a preferred embodiment according to the present invention is applicable. A drive system in this embodiment is, as shown in FIG. 1, provided with an engine 1 and coaxial multi-layer motor 2 (two motors) as vehicular power sources, a differential gear transmission 3 as a vehicular transmission, an output gear 4, a counter gear 5, a drive gear 6, a differential 7, and drive shafts (axles) 8 and 8 as an output mechanism.

Engine 1 is linked with a second ring gear R2 of differential gear transmission 3 via an engine output axle 10 and an engine clutch EC. Engine clutch EC is constituted by a hydraulic multi-plate clutch.

Coaxial multi-layer motor 2, as shown in FIG. 1, is disposed within a motor chamber 13 and is fixed to a motor-and-gear casing 9. Coaxial multi-layer motor 2 is constituted by a stator S as a fixed (stationary) armature on which a coil is wound, an outer rotor OR disposed at an outside of stator S and in which permanent magnets (not shown) are buried, and an inner rotor IR disposed at an inside of stator S and on which permanent magnets (not shown) are buried, these stator S and inner and outer rotors IR and OR being coaxially arranged within motor-and-gear casing 9. A first motor/generator output axle 11 is linked to inner rotor IR constituting coaxial multi-layer motor 2 and a second motor/generator output axle 12 is linked to outer rotor OR constituting coaxial multi-layer motor 2. Hereinafter, a structure as stator S+ inner rotor IR is called a first motor/generator MG1 and a structure as stator S+outer rotor OR is called a second motor/generator MG2.

Differential gear transmission 3 is constituted by a Ravigneaux (type) planetary gear train, a low brake (LB)(engagement element), and a high brake HB (engagement element). Ravigneaux (type) gear train includes five revolutional elements having a common carrier C supporting mutually meshed first pinion P1 and second pinion P2, a first sun gear SS1 meshed with first pinion P1, a second sun gear SS2 meshed with second pinion P2, a first nng gear ring meshed with first pinion P1, and a second ring gear R2 meshed with second pinion P2. Low brake LB is constituted by a hydraulic multiple plate clutch and serves to fix first ring gear Ring to motor-and-gear casing 9 when engaged. High brake HB is constituted by a hydraulic multiple plate clutch and serves to fix first sun gear SS1 motor-and-gear casing 9 when engaged.

A linkage relationship from among four revolutional elements of differential gear transmission 3, power sources, and an output member (output mechanism) is as follows: first sun gear SS1 is linked with first motor/generator output axle 11, second sun gear SS2 is linked with second motor/generator output axle 12, and an output gear 4 is linked with common carrier C. Thus, on a lever diagram shown in FIG. 2, in a revolution speed (ascending) order, first motor/generator MG1 (SS1), engine ENG 1 (R2), output gear 4 Out (C), and second motor/generator MG2 (SS2) are aligned. Thus, a rigid body lever model by which a dynamic operation of the planetary gear train is simply represented can be introduced.

Figure 3:
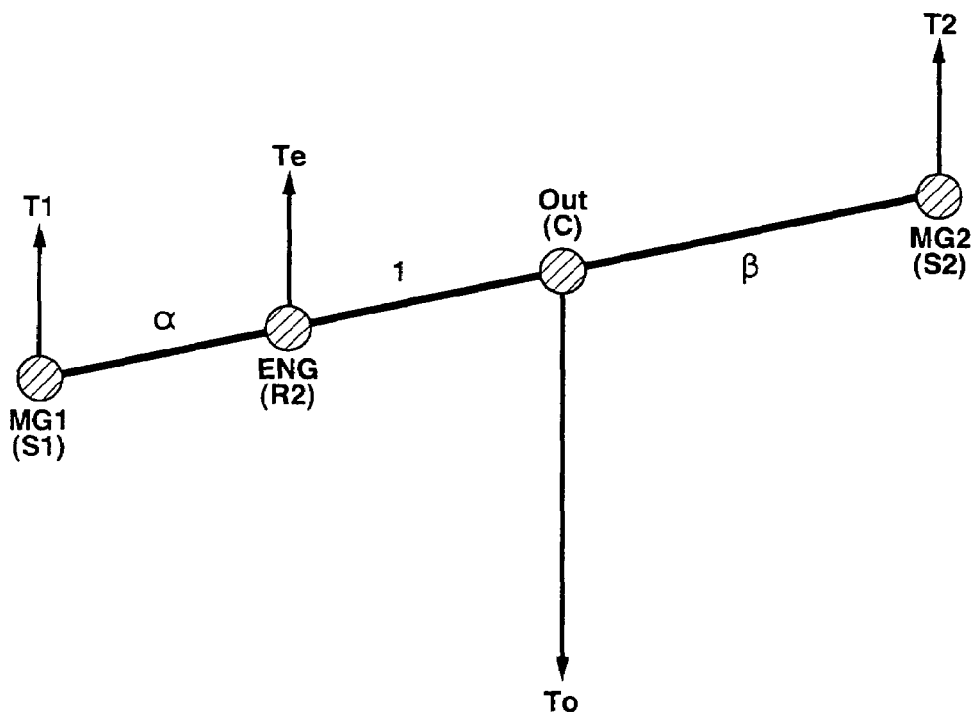
FIG. 3 is a torque balance diagram on the lever diagram of the differential gear transmission shown in FIG. 2.

Hence, suppose that an output axle revolution speed value No is known. At this time, all revolution speed relationships (speed relationships) are determined by determining one of three revolution speeds Ne, N1, and N2 of engine (ENG) 1, first motor/generator MG1, and second motor/generator MG2, namely, a transmission gear ratio is also determined. In this sense, a speed control of one of engine 1 and first and second motor/generators MG1 and MG2 are equivalent to a control over the gear ratio (or a shift ratio). On the other hand, it is known that, for relationships of four torques T1, Te, To, and T2 on a velocity (speed) diagram (or lever diagram), a determination of two torques of the four torques causes the determination of values of the remaining two torques irrespective of the speed relationship. For example, in differential gear transmission 3 shown in FIG. 1, as shown in FIG. 3, two torque balance equations as will be described below are given.

$$T1+Te+T2=To$$

$$(\alpha+1)T1+Te=\beta T2$$

The above two torque balance equations are always established. It is noted that T1 denotes a fist motor/generator (MG1) torque, T2 denotes a second motor/generator (MG2) torque, Te denotes an engine torque, and To denotes an output torque. It is also noted that the lever diagram means a speed diagram used, in place of a determination method using equations, to determine the gear ratio of the differential gear through a preparation of a diagram which is easier and easily understandable than the determination method using the equations, when considering the gear ratio of the differential gear. Then, a longitudinal axis denotes a revolution speed (revolutions per unit time (minute)) of each revolutinal element and each revolutional element of the ring gear, the carrier, the sun gear, and so on is taken along a lateral axis, an interval of each revolutional element being arranged to provide a tooth number ratio between the sun gear and the ring gear.

Figure 2:
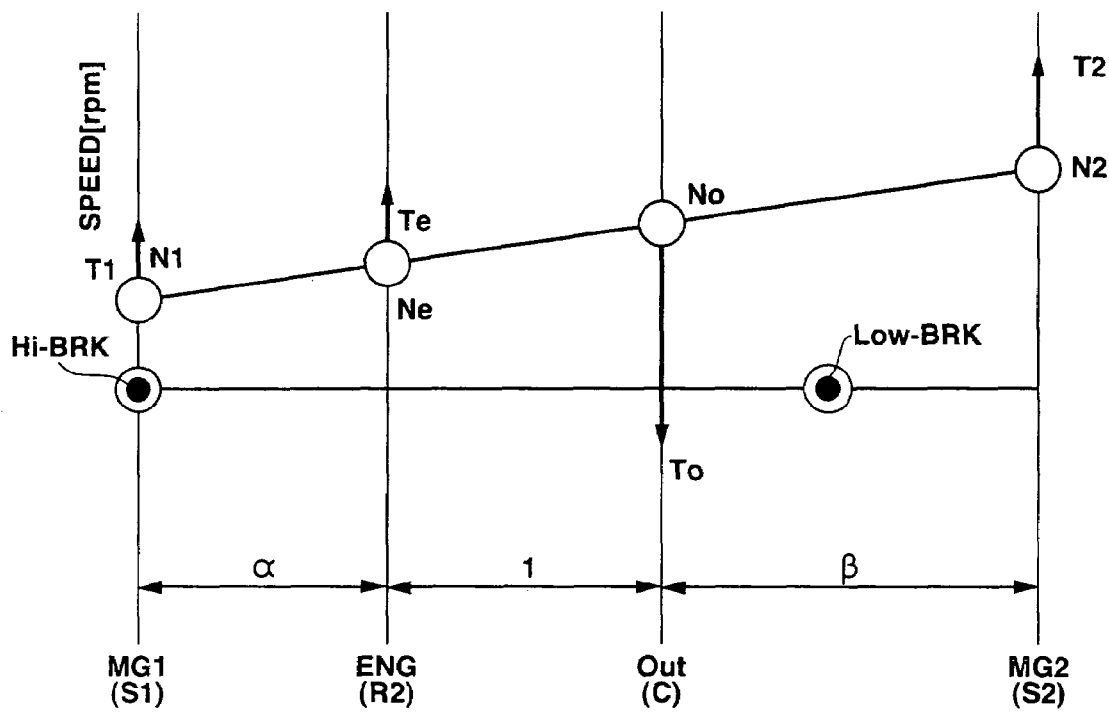
FIG. 2 is a lever diagram of a differential gear transmission shown in FIG. 1.

High brake HB is disposed at a position coincident with a revolution speed axis of first motor/generator MG1 on the lever diagram of FIG. 2 and serves to fix the gear ratio to an overdrive side high gear ratio through its engagement to first sun gear SS1, as shown in FIG. 2. Low brake LB is disposed at a position between the revolution speed axis of output gear 4 and the revolution speed axis of second motor/generator MG2 and serves to fix the gear ratio to an underdrive side low gear ratio through its engagement to first ring gear Ring. The output torque and the output revolution from output gear 4 are transmitted to driven road wheels (not shown) from drive shafts (axles) 8 and 8 passing through counter gear 5→drive gear 6→differential 7.

A control system in the first embodiment is constituted by an engine controller 21, a throttle valve actuator 22, a motor controller 23, an inverter 24, a battery 25, a hybrid controller 26, an accelerator opening angle sensor 27, a vehicle speed sensor 28 (vehicle speed detecting section (means)), a mode selection switch 29, engine (revolution) speed sensor 30, a first motor/generator revolution speed sensor 31, a second motor/generator revolution speed sensor 32, and a hydraulic control unit 33. Engine controller 21 inputs an accelerator opening angle information from accelerator opening angle sensor 27 and engine speed information from engine speed sensor 30 and outputs a command to control engine speed and engine torque to throttle valve actuator 22 in accordance with a command issued from hybrid controller 26.

Motor controller 23 inputs revolution speed information from both of first and second motor/generator revolution speed sensors 31 and 32 constituted by respective resolvers and outputs a control command to control revolution speed and torque of respective first and second motor/generators MG1 and MG2, independently of each other, to inverter 24.

Inverter 24 produces a compound (or composite) current which is a composite (superposition) of a drive current toward inner rotor IR and a drive current toward outer rotor OR in accordance with the control command from motor controller 23. Battery 25 is connected to inverter 24.

Hydraulic control unit 33 receives a control command from the hybrid controller 26 to perform an engagement control for engine clutch EC, high brake HB, and low brake LB and to perform a release control therefore. Hybrid controller 26 receives a vehicle speed information from vehicle speed sensor 28 and an accelerator opening angle information and engine speed information from engine controller 21 and executes predetermined arithmetic and logic operations. Hybrid controller 26 outputs respective control commands to engine controller 21, motor controller 23, and hydraulic control unit 33 in accordance with results of the arithmetic and logic operations executed therein. It is noted that hybrid controller 26 and engine controller 21 and hybrid controller 26 and motor controller 23 are mutually interconnected via bi-directional communication lines, respectively.

[Hybrid Controller]

Figure 4:
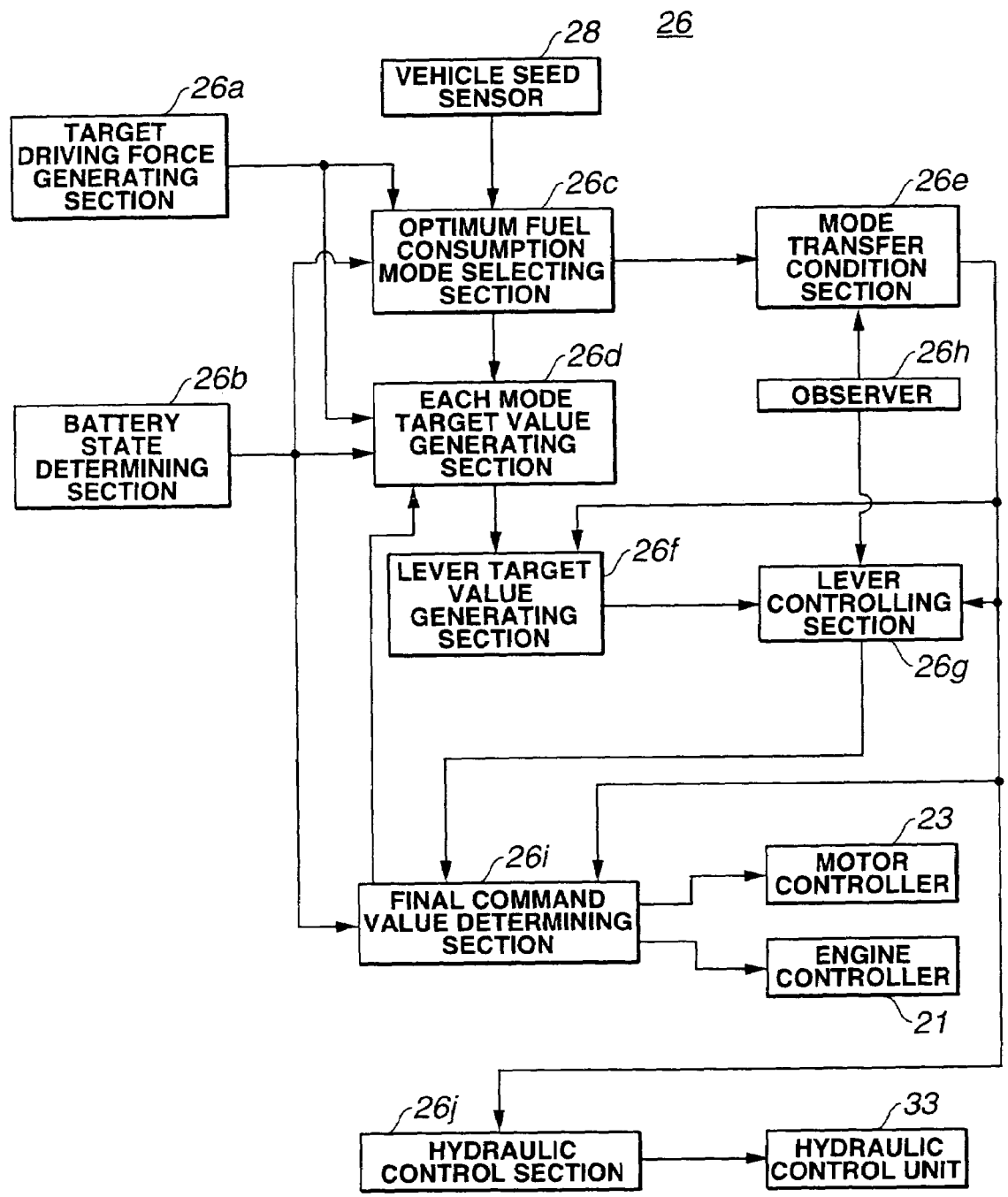
FIG. 4 is a schematic functional block diagram of a hybrid controller shown in FIG. 1.

FIG. 4 shows a control (functional) block diagram of hybrid controller 26 in the mode transfer control apparatus in this embodiment. In FIG. 4, hybrid controller 26 includes a target driving force generating section 26a (target driving force calculating section (means)), a battery state determining section 26b, an optimum fuel consumption mode selecting section 26c (mode selecting section (means)), each mode generating section 26d, a mode transfer condition section 26e, a lever control section 26g, an observer (or a state observer)(section) 26h, a final command value determining section 26i, and a hydraulic control section 26j (an engagement element controlling section (means)).

Target driving force generating section 26a generates a target driving force from a vehicle speed signal, an accelerator opening angle signal, and a shift range signal and outputs a target driving force signal to optimum fuel consumption mode selecting section 26a and each mode target value generating section 26d. Battery state determining section 26b performs SOC (State Of Charge) related accompanied calculations and various kinds of limitations on an instantaneous power to supply and receive an energy without remarkable deterioration of battery 25 and outputs a present charge state (SOC) of battery 25 and an input/output power enabling range of battery 25 to optimum fuel consumption mode selecting section (means) 26c, each mode target value generating section 26d, and final command value determining section.

Optimum fuel consumption mode selecting section 26c uses a set steady-state (static) mode area map (mode area map setting section (means)) including an area overlapping mutually areas in which an optimum fuel consumption is obtained for each steady-state mode. Optimum fuel consumption mode selecting section 26c selects a corresponding one of the steady-state modes in a case where the mode to which a driving point (determined according to the state of charge of battery 25 (SOC), the target driving force, and the vehicle speed) belongs is only one or selects the steady-state mode presently selected with a high priority in a case where the modes to which the driving point on the steady-state mode area map belongs are plural and outputs the selected steady-state mode as "a recommended mode" to each mode target value generating section 26d and mode transfer condition section 26e. Each mode target value generating section 26d receives the "recommended mode" from optimum fuel consumption mode selecting section (means) 26c, generates the target value for each "recommended mode", and outputs the generated target value to lever target value generating section 26f. As speed operating points, arbitrary two of the four revolutional elements of the planetary gear train are sufficient. For torque commands, each mode target value generating section 26d outputs the torque commands to three torque actuators (engine 1, motor/generators MG1 and MG2).

Mode transfer condition section 26e receives the recommended mode from optimum fuel consumption mode selecting section (means) 26c, a speed state from each revolution speed sensor of engine 1 and first and second motor/generators MG1 and MG2, the engine torque estimated value from observer 26h. In addition, a preparation end signal from each system of the vehicle is received and an allowance and an inhibit of mode transfer from one steady-state mode to another steady-state mode are determined. When the mode transfer is allowed, the control is switched sequentially in accordance with a mode transfer sequence (mode transfer step). Furthermore, in a required sequence mode step, the determination of engine start and stop and the engagement and release control of the brake are carried out.

Lever target value generating section 26f generates instantaneous speed command value and torque command value which are smooth lever target values from speed command and torque command on a start point outputted from each mode target value generating section 26e and speed command and torque command of an end point mode outputted from each mode target generating section 26e in accordance with the sequence mode step from mode transfer condition section 26e and outputs the instantaneous speed command value and torque command value to lever controlling (control) section 26g.

Lever controlling section 26g includes a transmission gear ratio control section that control gear ratios in a continuously variable transmission gear ratio mode and in a fixed transmission gear ratio mode and a driving force control section, achieving an instantaneous speed command value (any revolution speed of engine 1 and first and second motor/generators MG1 and MG2) and a torque command value in a feedback control mode, outputs these command values to final command value determining section 26f. Observer 26h generates an engine torque estimated value, a travel resistance torque estimated value, and so forth and outputs these estimated values to mode transfer condition section 26e and lever controlling section 26g.

Final command value determining section 26i retrieves the sequence transfer step from mode transfer condition section 26e and speed command value and torque command value from lever controlling section 26g, outputs a motor torque command value to motor controller 23 with the battery charge state taken into consideration, and outputs an engine torque command value to engine controller 21. Hydraulic control section 26j receives sequence transfer step from mode transfer condition section 26e and outputs engagement and release control commands to engage and release engine clutch EC, low brake LB, and high brake HB to hydraulic control unit 33.

[Steady-State Mode]

In the preferred embodiment, the steady-state (or static) mode in the hybrid (vehicle) system includes a continuously variable transmission gear ratio (speed ratio) mode in which both brakes LB and HB are released and the continuously variable transmission ratio is obtained and a fixed transmission gear ratio mode in which one of low and high brakes LB and HB is engaged to obtain the fixed transmission gear ratio. In addition, continuously variable transmission gear ratio mode includes an E-iVT mode in which engine 1 and both of first and second motor/generators MG1 and MG2 are used as drive power sources and an EV mode in which only both of first and second motor/generators MG1 and MG2 are used as the drive power sources. On the other hand, fixed transmission gear ratio mode includes an LB mode in which the vehicle travels by the drive of engine 1 and one of first and second motor/generators MG1 and MG2 with low brake LB engaged, an EV-LB mode in which the vehicle travels by the drive of only two of first and second motor/generators MG1 and MG2 while low brake LB is engaged, and an EV-HB mode in which the vehicle travels by the drive of only second motor/generator MG2 and with high brake HB engaged.

Hybrid controller 26 automatically selects the recommended mode in which the fuel consumption is optimal from a vehicle state (for example, vehicle speed), the target driving force (for example, the target driving force calculated from the accelerator opening angle and the vehicular speed), and the battery charge state and carries out the mode transfer sequence to perform a mode transfer when the mode transfer from the presently selected mode to the recommended mode is carried out or when the mode is selected according to an operation of mode selection switch 29.

In the mode transfer sequence control, it is not only necessary to perform controls over an engine start and engine stop and in which the operating point of engine 1 and both of first and second motor/generators MG1 and MG2 is transferred and the engagement-and-release control for engine clutch EC but also to perform the engagement control and release control for low brake LB and high brake HB in a case where the mode transfer is carried out between the continuously variable transmission ratio mode and the fixed transmission gear ratio mode.

EV-iVT mode is a mode in which the transmission gear ratio is variable and the vehicle travels using engine 1 and both of first and second motor/generators MG1 and MG2 as the drive power sources. In E-iVT mode, a battery output power is determined from SOC (State Of Charge) and charge-and-discharge enable power range from battery state determining section 26b. When the battery output power is determined, an engine output is determined from the vehicle speed and the driving force. Hence, when an equivalent-engine output line is traced on an engine operating plane (its longitudinal axis denotes the engine torque and its lateral axis denotes the engine speed) and a point at which a result of calculation of an equation such that {(vehicle speed)×(driving force)+(battery charge power)−(total motor loss)}/(engine use fuel flow quantity)

gives a maximum is selected, an engine driving point (Ne, Te) at which a (hybrid) system efficiency is maximum can be selected. Motor driving points (N1, T1, N2, T2) are determined by inputting engine speed Ne, output axle revolution speed No, and engine torque Te and solving the following simultaneous (dynamic) equations (so-called, E-iVT balance equations) of equations (1) through (5) supposing that Pb (battery power)=0 (refer to FIG. 2).

$$N1 = Ne + \alpha(Ne - No) \quad (1)$$

$$N2 = No - \beta(Ne - No) \quad (2)$$

$$To = T1 + T2 + Te \quad (3)$$

$$N1 \cdot T1 + N2 \cdot T2 = Pb \quad (4)$$

$$\alpha T1 + To = (1 + \beta) T2 \quad (5),$$

wherein N1 and T1 denote revolution speed and torque of first motor/generator MG1, N2 and T2 denote revolution speed and torque of second motor/generator MG2, and α and β denote gear tooth number ratios of planetary gear train.

EV mode is a mode in which a gear ratio at which the vehicle travels using two of first and second motor/generators MG1 and MG2 as the drive power source. In EV mode, the control is carried out in such a way that both of the following equations (6) and (7) are established.

$$N2 = \{1/(1+\alpha)\}\{-\beta N1 + (1+\alpha+\beta)No\} \quad (6)$$

$$T1 = \{\beta/(1+\alpha+\beta)\}To$$

$$T2 = \{(1+\alpha)/(1+\alpha+\beta)\}To \quad (7)$$

As shown in equations (7), torques T1 and T2 of respective first and second motor/generators MG1 and MG2 are uniquely determined in accordance with target driving force To. At this time, a power loss generated at first and second motor/generators MG1 and MG2 and their controllers is uniquely determined in accordance with a combination (=transmission gear ratio: when the vehicle speed is given and one of the revolution speeds (N1 and N2) is determined, the other thereof is accordingly determined) of the revolution speeds (N1 and N2) of the first and second motor/generators MG1 and MG2. Hence, if the combination (N1, N2) of revolution speeds of first and second motor/generators MG1 and MG2 is determined, to minimize the power loss, motor operating points (N1, T1, N2, T2) of first and second motor/generators MG1 and MG2 are determined (refer to FIG. 5).

EV-LB mode is a mode in which the vehicle runs (travels) through the drive of only two of first and second motor/generators MG1 and MG2 as the power sources with low brake engaged (LB ON). In EV-LB mode, the transmission gear ratio is constant at a low side (predetermined low gear ratio). Then, if the vehicle speed is determined, the combination (N1 and N2) of the revolution speeds of first and second motor/generators MG1 and MG2 is determined. Then, since the engagement of low brake LB causes a reaction force against driving force target value To (output torque) to be received. Hence, torques T1 and T2 of respective first and second motor/generators MG1 and MG2 are given as T1=−T2 to suppress a vehicle speed variation (=a variation of revolution speed No of output gear (axle OUT) with the rigid lever balanced (refer to FIG. 6. It is noted that, in FIGS. 5 and 6, ENG OFF means that engine 1 is stopped, LB OFF means that low brake LB released, and LB ON means that low brake LB is engaged.

Next, an action of the hybrid system to which mode transfer control apparatus in the preferred embodiment is applicable will be described below.

[Mode Selection Process]

Figure 7:
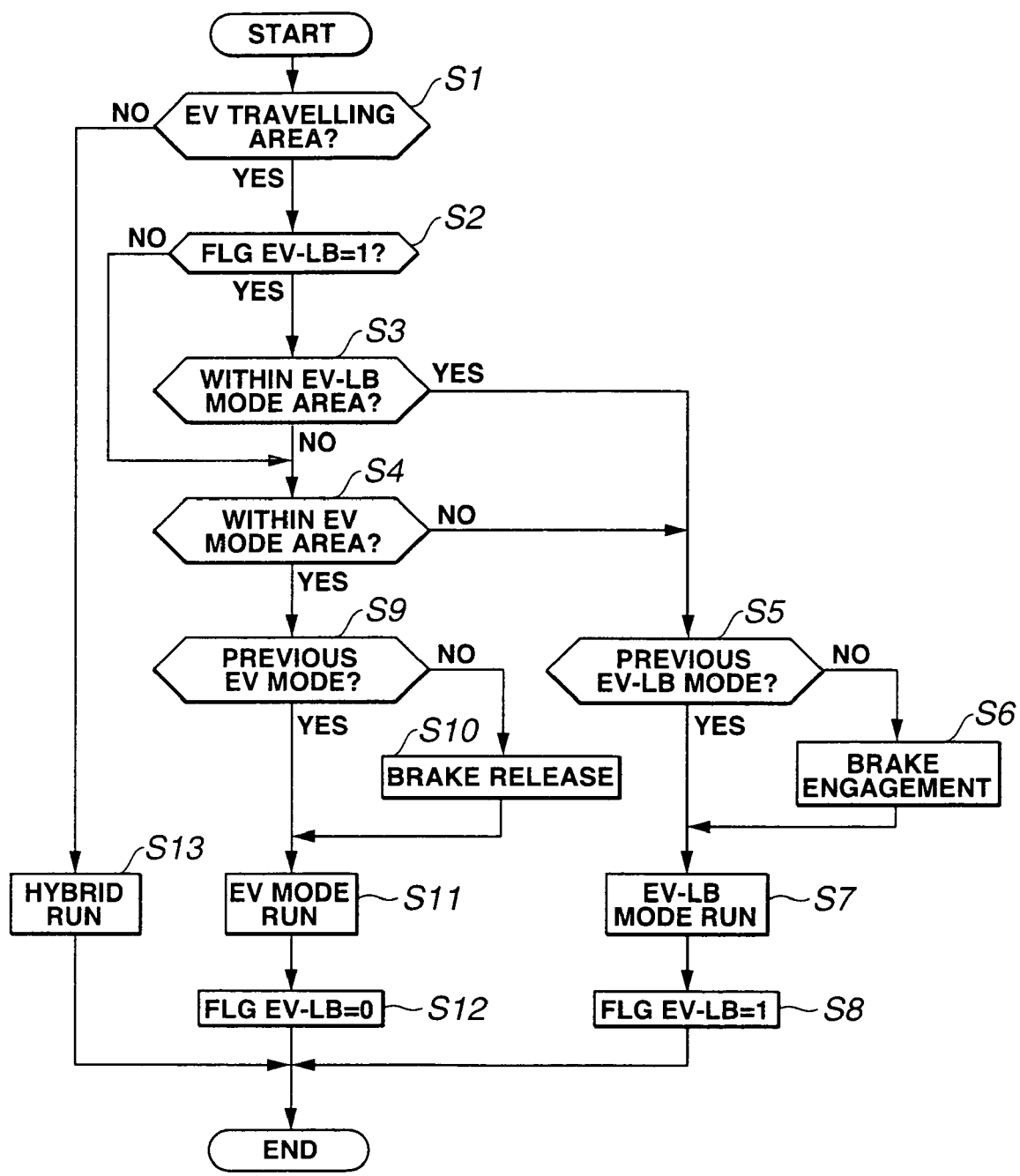
FIG. 7 is an operational flowchart representing a flow of a mode selection process repeatedly executed for a constant period of time in an optimum fuel consumption mode selecting section in the hybrid controller shown in FIG. 4.
Figure 8:
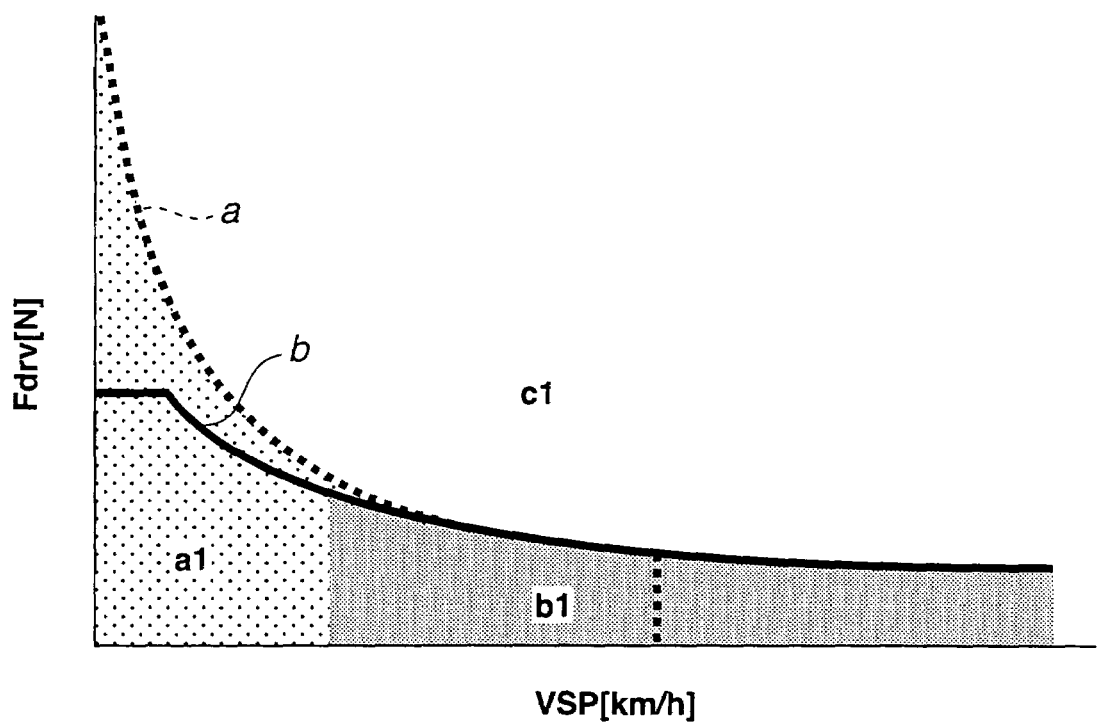
FIG. 8 is a steady-state mode area map view representing relationships from among maximum driving force lines and optimum fuel consumption (steady-state mode) areas.

FIG. 7 shows an operational flowchart representing a flow of a mode selection process executed repeatedly at a constant period by optimum fuel consumption mode selecting section (means) 26c of hybrid controller 26 in the embodiment according to the present invention. In the flowchart shown in FIG. 7, a steady-state mode area (region) map as shown in FIG. 8 is set. In FIG. 8, a bold broken line of a denotes a maximum driving force line in EV-LB mode, a bold solid line of b denotes the maximum driving force line in EV mode, a1 denotes an optimum fuel consumption area in EV-LB mode, b1 denotes the optimum fuel consumption area in EV mode, c1 denotes a hybrid mode area.

That is to say, at a step S1, hybrid controller 26 (optimum fuel consumption mode selecting section 26c) determines whether the present driving point is present within an area enclosed by maximum driving force line a in EV-LB mode or an area enclosed by maximum driving force line b in EV mode (=EV traveling area) or not. If Yes at step S1, the routine goes to a step S2. If No at step S1, the routine goes to a step S13. At step S2, hybrid controller 26 determines whether a flag FLG EV-LB is set to "1" (representing that the vehicle is traveling in the EV-LB mode) on the basis of a determination that the vehicle is traveling at the electric vehicle run (EV travel) (the driving point is present within the area enclosed by line a or line b) at step S1. If Yes at step S2, the routine goes to a step S3. If No at step S2, the routine goes to a step S4.

At step S3, hybrid controller 26 determines whether the present driving point is present within an area of maximum driving force line a of EV-LB mode on the steady-state mode area map shown in FIG. 8 on the basis of the determination at step S2 that the vehicle is traveling in the EV-LB mode. If Yes at step S3, the routine goes to a step S5. If No at step S3, the routine goes to a step S4.

At step S4, hybrid controller 26 determines whether the present driving point is present within the area enclosed by maximum driving force line b of EV mode on the steady-state mode area map shown in FIG. 8 on the basis of the determination at step S3 that the present driving point is not present within the area enclosed by maximum driving force line a of EV-LB mode. If Yes at step S4, the routine goes to a step S9. If No at step S4, the routine goes to step S5.

At step S5, hybrid controller 26 determines whether the EV-LB mode at a previous time has previously been selected on the basis of a determination at step S4 that the present driving point is present within the area enclosed by maximum driving force line b of EV mode on the steady-state mode area map. If Yes at step S5, the routine goes to a step S7. If No at step S5, the routine goes to a step S6. At step S6, hybrid controller 26 issues the command to engage low brake LB and the routine goes to step S7 on the basis of the determination that the EV-LB mode at a previous time has not previously been selected.

At step S7, hybrid controller 26 determines that the vehicle is traveling in the electric vehicle run by the fixed transmission gear ratio with low brake LB engaged in EV-LB mode according to the result of determination at step S5 that this steady-state mode has previously been selected at step S5 or the engagement of low brake LB at step S6 and the routine goes to a step S8. At step S8, hybrid controller 26 sets flag FLG EV-LB to "1" to represent that the vehicle is traveling in the EV-LB mode. (If FLG EV-LB is reset to "0", hybrid controller 26 determines that the vehicle is traveling not in EV-LB mode but in EV mode.)

At step S9, hybrid controller 26 determines whether EV mode at the previous time has previously been selected on the basis of a determination at step S4 that the present driving point is present within the area enclosed by maximum driving force line b of the EV mode on the steady-state mode area map shown in FIG. 8. If Yes at step S9, the routine goes to a step S11. If No at step S9, the routine goes to a step S10. At step S10, hybrid controller 26 releases low brake LB on the basis of the determination at step S9 that EV mode is not selected at the previous routine (EV mode has not previously been selected). Then, the routine goes to step S11 to determine that the vehicle is traveling in EV mode and the routine goes to a step S12. At step S12, hybrid controller 26 resets flag FLG EV-LB to "0" representing that the vehicle is traveling in EV mode and the present routine is ended. At step S13, hybrid controller 12 determines that the vehicle is traveling in the E-iVT mode or so forth on the basis of the determination at step S1 that the present driving point is not present in the EV traveling area at step S1, namely, on the basis of the determination that the present driving point is present in a hybrid mode area c1 on the steady-state mode area map shown in FIG. 8 and the present routine is ended.

[Mode Selection Action]

For example, when the vehicle starts at the vehicle speed of 0 Km/h and the present driving point is present within the area only in the EV-LB mode on the steady-state mode area map, the routine shown in FIG. 7 advances as follows: Step S1→step S2→step S4→step S5→step S6. At step S6, low brake LB is engaged. Then, the routine goes to step S7 at which the vehicle starts in the electric vehicle run at the fixed transmission gear ratio of the EV-LB mode with low brake LB engaged. Then, at step S8, flag FLG EV-LB is set to "1" (FLG EV-LB=1). After the vehicle start, since flag FLG EV-LB is set to "1", in the flowchart of FIG. 7, the routine advances as follows: step S1→step S2→step S3. At step S3, only if the present driving point is present within the area enclosed by maximum driving force line a of the EV-LB mode, the routine goes to step S5→step S7. Thus, the electric vehicle run by the fixed transmission gear ratio in the EV-LB mode with low brake LB engaged is maintained.

Then, when the present driving point is present within the area enclosed by maximum driving force line b of EV mode on the steady-state mode area map shown in FIG. 8, in the flowchart shown in FIG. 7, the routine advances as follows: step S1→step S2→step S3→step S4→step S9→step S10. At step S10, low brake LB is released and the routine goes to step S11. Thus, the vehicle is traveling in the electric vehicle run and in the continuously variable transmission gear ratio of EV mode. Furthermore, the routine goes to a step S12. At step S12, flag FLG EV-LB is reset to "0". Thereafter, only if the present driving point is present within the area enclosed by maximum driving force line b on the steady-state mode area map, the routine in the flowchart of FIG. 7 advances as follows: step S1→step S2→step S4→step S9→step S11. Thus, the vehicle is traveling maintaining the electric vehicle run by the continuously variable transmission ratio in EV mode.

Furthermore, when the present driving point of the vehicle enters hybrid mode area c1 from the area enclosed by maximum driving force line b on the steady-state mode area map shown in FIG. 8, in the flowchart of FIG. 7, the routine goes from step S1 to step S13. Thus, the electric vehicle is transferred into hybrid (vehicle) system run by the E-iVT mode or so on.

[Problem to be Solved During the Mode Transfer]

A Japanese Patent Application First Publication No. 2000-142146 published on May 23, 2000 exemplifies a previously proposed hybrid vehicle purpose driving apparatus in which the differential gear is used in the drive system of the hybrid vehicle and three elements of the sun gear, the planet carrier, and the ring gear constituting the planetary gear mechanism are linked with the generator, the engine, and the motor of the drive system, respectively.

In the previously proposed driving apparatus described above, a part of the engine output is distributed toward a drive of the generator utilizing a differential function of the gear and the generated electric power of the generator is supplied to the motor so that an increase or decrease of the torque of the continuously variable transmission and the output torque can be carried out. However, in the previously proposed driving apparatus, it is difficult to enlarge a mechanical energy passing through the planetary gear from a viewpoint of a restriction on the mechanism. Hence, it is accordingly necessary to make sizes of the generator, the motor, and their driving devices large. Especially, since a rate of a motive power passing through the generator and the motor with respect to the motive power passing through the differential gear (unit) approaches to 1 at the low speed (gear) ratio side and the motive power passing through the generator and the motor cannot be enlarged any more. Therefore, it is necessary to provide a high output power source approximately equal to the output power of the engine for the generator and the motor in order to sufficiently secure the driving force during the vehicular start. In the previously proposed driving apparatus described above, a part of the engine output is distributed toward the drive device for the generator utilizing a differential function of the gear and the generated electric power of the generator is supplied to the motor so that an increase or decrease of the torque of the continuously variable transmission and the output torque can be carried out. However, in the previously proposed driving apparatus disclosed in the Japanese Patent Application First Publication No. 2000-142146, it is difficult to enlarge a mechanical energy passing through the planetary gear mechanism from a viewpoint of a restriction on the mechanism. Hence, it is accordingly necessary to make sizes of the generator, the motor, and their driving devices large. Especially, since a rate of a motive power passing through the generator and the motor with respect to the motive power passing through the differential gear (unit) approaches to 1 (one) at the low speed (gear) ratio side and the motive power passing through the generator and the motor cannot be enlarged any more. Therefore, it is necessary to provide high output power source approximately equal to the output power of the engine for generator and motor side in order to sufficiently secure the driving force during the vehicular start. Accordingly, the size and weight of the whole drive apparatus are accordingly enlarged and a system efficiency is accordingly lowered.

To solve the above-described problem, another driving apparatus for the hybrid vehicle has been proposed in Japanese Patent Application First Publication No. 2003-34153 published on Feb. 4, 2003, No. 2003-34154 published on Feb. 4, 2003, or No. 2003-34155 published on Feb. 4, 2003. Each of these Japanese Patent Application First Publications describes that a vehicle start performance has been improved without enlargement of the capacity of each motor/generator. In the differential gear (transmission) unit constituted by, for example, a planetary gear mechanism of two-degrees of freedom having four or more elements, a brake is installed on any one of the elements other than the element to which an output to the drive system of the vehicle is allocated to brake the corresponding element so that a large reduction gear ratio between the power source and the drive system can be set. Thus, the larger driving force can be developed. At the same time, such an operating area in which the engagement of the brake permits electrical and mechanical energy losses to be reduced even in a range of the driving force which can be generated with the brake engaged becomes present. In such a differential gear unit as described above if the speed of any two elements is determined, the speeds of the other elements are determined. Thus, driving apparatus acts as a system of two degrees of freedom in a case where the above-described brake is not engaged. This drive apparatus, i.e., the system of two degrees of freedom is structured in such a way that two of planetary gear sets (a couple of planetary gears) each planetary gear set being constituted by three elements of ordinary sun gears, carriers, and ring gears, any two elements being common, for example, a first planet carrier being common to a second planet carrier, and a first planet carrier is meshed with a second planet carrier is meshed with a second planet carrier are achieved. FIG. 2 shows the relationship among the speeds of respective elements called a speed diagram of respective elements of two planetary gear sets. At this time, if the speed of the output axle is known, any one of three speeds of engine and two motors is determined so that all speed relationships are determined, namely, the gear ratio is also determined. In this meaning, a speed control of any one of engine and two motors is equivalent to a control of the transmission gear ratio. For the relationships among four torques of four elements on the speed diagram, if two torques are determined, the remaining two torque values are determined irrespective of the speed relationship. For example, in the differential gear mechanism (unit) shown in FIG. 1, a torque balance shown in FIG. 3 is always established.

Figure 5:
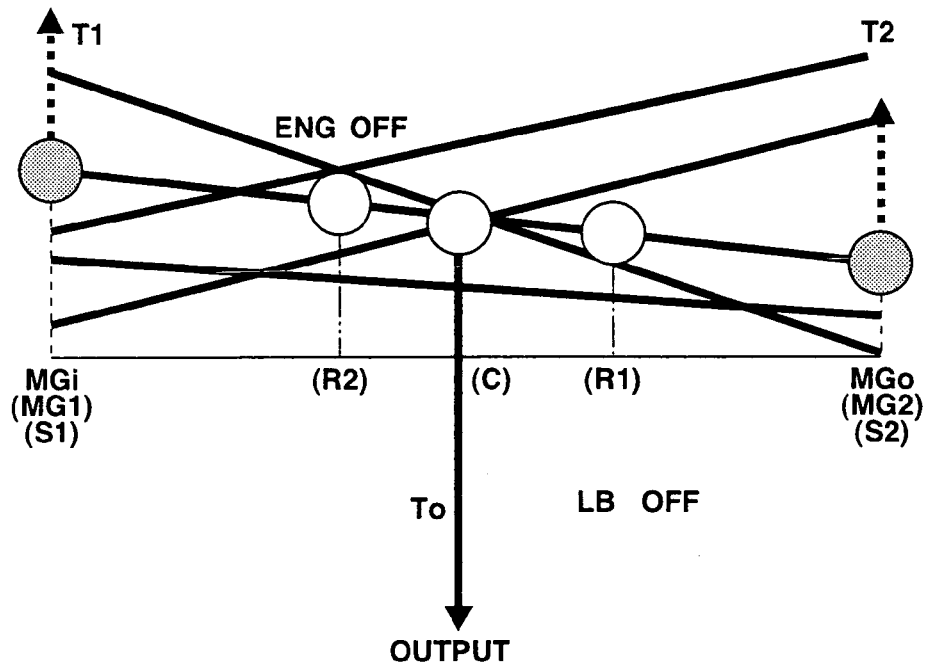
FIG. 5 is a lever diagram in an EV mode in the embodiment of the mode transfer control apparatus shown in FIG. 1.
Figure 6:
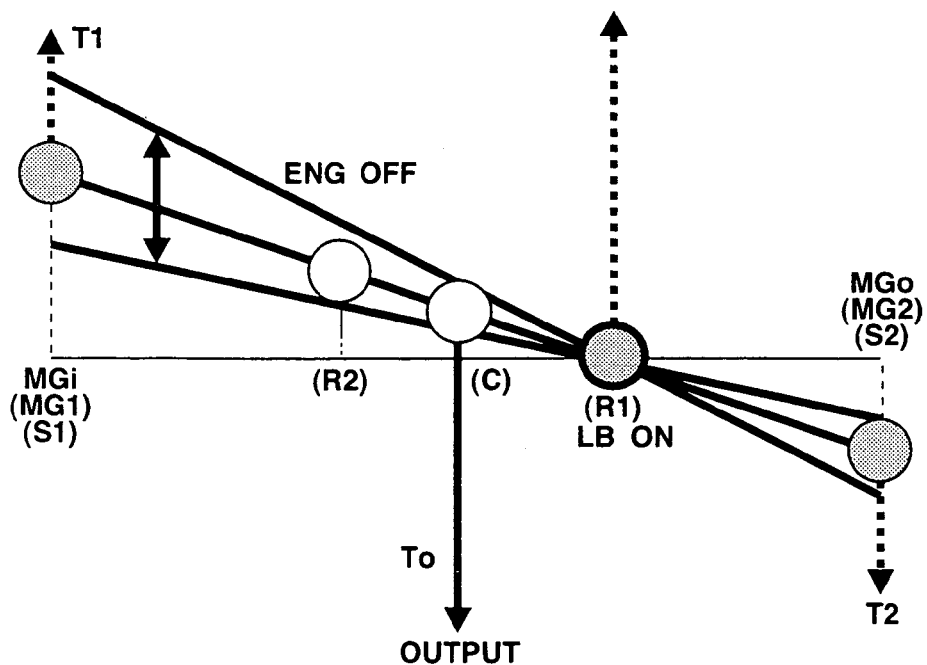
FIG. 6 is a lever diagram in an EV-LB mode in the embodiment of the mode transfer control apparatus shown in FIG. 1.

In a case where, in such a system as described above, the brake is installed on any one of the elements other than the element to which the output to the drive system is allocated as disclosed in the Japanese Patent Application First Publication No. 2003-34153, the speed diagram in the EV mode is shown in FIG. 5 and the speed diagram in the EV-LB mode is shown in FIG. 6.

However, in the hybrid vehicle in which the power train system (in which the brake is installed on any one of the elements other than the element to which the output to the drive system is allocated) is applied to the differential gear transmission constituted by, for example, the planetary gear mechanism having two degrees of freedom and having four or more elements as disclosed in the Japanese Patent Application First Publication No. 2003-34153, suppose that the vehicle is traveling at a certain speed.

In this state, in a case where the mode transfer from EV mode shown in FIG. 5 to EV-LB mode shown in FIG. 6 occurs, the brake is engaged under a state in which the speed of the brake to be engaged is not zeroed. At this time, since the speed of the brake is zeroed as a result of a forceful modification of the revolution speed of each element, viz., an inertia torque due to the acceleration is developed. A driving force shock is accordingly developed. On the other hand, in a case where the mode transfer from the EV-LB mode shown in FIG. 6 to the EV mode shown in FIG. 5 occurs, the driving force shock occurs due to a reaction force balance to an inertia force acted upon each element when the brake is released.

[Mode Transfer Action]

A mode transfer action in the mode transfer control apparatus will be described below. FIG. 8 shows the steady-state mode area map representing the relationship between maximum driving force lines in EV mode and in EV-LB mode and optimum fuel consumption areas in EV mode and in EV-LB mode. In FIG. 8, line a denotes the maximum driving force line in EV-LB mode, line b denotes the maximum driving force line in EV mode, a1 denotes the optimum fuel consumption area of EV-LB mode, b1 denotes the optimum fuel consumption area of EV mode, and c1 denotes the hybrid mode area in, for example, E-iVT mode. A difference in areas a1 and b1 is caused by an electric system loss.

That is to say, the EV mode in which a driving force load is shared with the first motor/generator MG1 and second motor/generator MG2 is smaller in the electric system loss and is better in the fuel consumption than EV-LB mode. On the other hand, EV-LB mode with low brake LB engaged is, in many cases, selected during the start of the vehicle from vehicle speed of 0 Km/h from a standpoint of the driving force. Hence, as described in the [Mode Selection Action], low-brake LB is engaged during the start of the vehicle. Thereafter, as the vehicle speed becomes higher, the mode enters the fuel consumption area of EV mode. Hence, judging from the standpoint of a fuel economy (low fuel consumption), the mode is transferred to EV mode with low brake LB released. It is noted that, although the driving force torque shock due to the engagement and release of low brake occurs during the start of the vehicle, the difference in the efficiency between the EV-LB mode and the EV mode is minor and in a short time. Hence, even if the vehicle is traveling still in EV-LB mode, a remarkably large worsening of the fuel consumption is not brought out.

Consequently, the mode transfer from EV-LB mode to EV mode is suppressed and the vehicle is traveling wholly in EV-LB mode within a whole area enclosed by maximum driving force line a of EV-LB mode shown in FIG. 8. Thus, the vehicular start without the driving force shock becomes possible at an almost constant fuel consumption.

On the contrary, in a case where the vehicle can be started in the EV mode in a case where the driving force is not remarkably needed such as the vehicular start on a descending slope (downhill start), in the flowchart of FIG. 7, the routine advances as follows: step S1→step S2→step S4→step S9→step S11. Thus, only if the driving point is present within the area enclosed by maximum driving force line b of the EV mode on the steady-state mode area map as shown in FIG. 8, the electric vehicle run is maintained in the continuously variable transmission gear ratio of EV mode. Therefore, if it is not necessary to advance to EV-LB mode in order to further require the driving force, the mode transfer from EV mode to EV-LB mode is suppressed and the vehicle is traveling wholly in EV mode within the whole area (including the overlap area enclosed by line a) enclosed by maximum driving force line b of the EV mode. Thus, the driving force shock can be eliminated.

Next, advantages of the mode transfer control apparatus in the embodiment according to the present invention will be described below.

(1) In the mode transfer control apparatus for the hybrid vehicle including the power sources constituted by engine 1 and two motor/generators MG1 and MG2, differential gear transmission 3 having the planetary gear train in which respective power sources are linked with revolutional elements thereof and engagement elements, each engagement element achieving the fixed transmission gear ratio when engaged from a state in which the continuously variable transmission gear ratio function is provided when released, the mode selecting section that selects one of the driving steady-state modes from the continuously variable transmission (speed) ratio mode in the state in which the engagement elements are released and the fixed transmission gear ratio mode in the state in which the corresponding one of the engagement elements is engaged, and the engagement element controlling section that performs the engagement-and-release control for each of the engagement elements, vehicle speed sensor 28, target driving force generating section 26a that generates the target driving force, and the mode area map setting section that sets the steady-state mode area map including the areas of the continuously variable transmission gear ratio mode and of the fixed transmission gear ratio mode and an overlap area therebetween according to the vehicle speed (VSP in FIG. 8) and target driving force (driving force Fdrv in FIG. 8) are installed, the mode selecting section (hybrid controller 26) inhibiting, in the state in which the driving point determined according to the vehicle speed detection value and the target driving force calculation value is present within the overlap area in which both modes are selectable on the steady-state mode area map in the state in which the vehicle is started or is traveling in one of the modes of the continuously variable transmission gear (speed) ratio mode and the fixed transmission gear ratio mode, the mode transfer to the other transmission gear ratio mode. Hence, while determining the appropriate steady-state mode in the vehicular start state or in the travel state, the frequent mode transfers between the two modes of the continuously variable transmission gear ratio and the fixed transmission gear ratio are avoided. Consequently, a generation frequency of the driving force shock can be suppressed.

(2) The mode selecting section (hybrid controller 26) allows the mode transfer to the other transmission gear ratio mode only if the driving point of the vehicle determined according to the vehicle speed detection value and the target driving force calculation value is in excess of the one mode selectable area on the steady-state mode area map in the state in which the vehicle is started or is traveling in the one mode. Hence, it becomes possible to avoid the frequent mode transfers between the continuously variable transmission gear (speed) ratio mode and the fixed transmission gear ratio mode. Thus, the generation frequency of the driving force shock can be suppressed.

(3) Differential gear transmission 3 includes the planetary gear train having two degrees of freedom and having the elements which are linked with first motor/generator MG2 in the revolution speed order on the lever diagram and low brake LB disposed between output gear 4 and second motor/generator MG2 on the lever diagram to fix the gear ratio to the low gear ratio when engaged, the continuously variable transmission gear ratio mode being EV mode in which the vehicle is started or traveled, while achieving the continuously variable transmission gear ratio by the drive of only the first motor/generator MG1 and second motor/generator MG2 and the fixed transmission gear ratio mode being EV-LB mode in which low brake LB is engaged and the vehicle is started or traveled by the drive of both of first motor/generator MG1 and second motor/generator MG2. Hence, the following advantages can be obtained.

In the state in which the vehicle is started or traveled in EV-LB mode, it becomes possible for the vehicle to travel in EV-LB mode without the transfer to EV mode even if EV mode is selected during the vehicular run. In addition, since a power flow quantity in both of EV mode and EV-LB mode are approximately equal to a power capacity of battery 25, the vehicular run without a significant worsening of the fuel consumption and without the driving force shock can be achieved.

In the state in which the vehicle is started or traveled in EV mode, it becomes possible for the vehicle to travel in EV mode without the transfer to EV-LB mode even if EV-LB mode is selected during the vehicular run. In addition, during the low vehicle speed of the vehicle, EV mode is, in general, smaller in the electric system loss and better in the fuel consumption than EV-LB mode since, in EV mode, the driving force load is shared with both of first and second motor/generators MG1 and MG2. Hence, the vehicular run with the improvement in the fuel consumption and without the driving force shock can be achieved.

(4) Since the mode selecting section (hybrid controller 26) does not transfer to any other mode than EV mode in the state in which EV mode is selected and the vehicle is started or traveled in EV mode unless the driving point of the vehicle determined according to the vehicle speed detection value and the target driving force calculation value is in excess of EV mode selectable area on the steady-state mode area map. Hence, in the state in which the vehicle is started or traveled in EV mode, even if any other mode than the EV mode is selected from the standpoint of the fuel consumption or so forth, the vehicle can be traveled in EV mode unless the driving point is in excess of an EV mode travel enabling area (range). The difference in the efficiency of each mode during the low speed vehicular run is minor and the vehicular run without worsening of the fuel consumption and without the occurrence in the driving force shock can be achieved.

As described hereinabove, the mode transfer control apparatus for the hybrid vehicle in the embodiment according to the invention has been explained. However, the present invention is not limited to the above-described embodiment for the specific structure. Various changes and modifications can be made without departing from the sprit and scope of the present invention which is defined in the appended claims.

For example, in the embodiment, Ravigneaux (type) planetary gear set is the example of the planetary gear train. However, the present invention is applicable to another planetary gear train in which the engagement of the engagement element (such as the clutch or the brake) permits the transfer from the state having the continuously variable transmission function to the fixed transmission gear ratio.

In the mode transfer control apparatus in the embodiment described above, the power source of the vehicle is exemplified by one engine-and-two motor power sources. However, the present invention is applicable to another hybrid vehicle in which at least one engine-and-one motor (1 engine and 1 motor) is mounted.

In the mode transfer control apparatus in the embodiment, as first motor/generator MG1 and second motor/generator MG2, coaxial multi-layer motor 2 is exemplified which is constituted by the common stator and two rotors and, on appearance, is constituted by one motor/generator but, functionally, is constituted by two motor/generators. The present invention is applicable to two independent motor/generators.

In the mode transfer control apparatus in the embodiment, the mode transfer between EV mode and EV-LB mode is exemplified. However, the present invention is applicable to another mode transfer between EV mode and EV-HB mode.

The entire contents of a Japanese Patent Application No. 2003-178434 (filed in Japan on Jun. 23, 2003) are herein incorporated by reference. The scope of the invention is defined with reference to the following claims.

What is claimed is:

1. A mode transfer control apparatus for a hybrid vehicle, comprising:

power sources including an engine and at least one motor;

a differential gear transmission including a planetary gear train in which the respective power sources are linked with revolutional elements of the planetary gear train and at least one engagement element that is engaged to achieve a fixed transmission gear ratio from a state in which the engagement element is released to provide a continuously variable transmission function for the planetary gear train;

a mode selecting section that selects one steady-state mode from modes of a continuously variable transmission gear ratio in which the engagement element is released and a fixed transmission gear ratio in which the engagement element is engaged;

an engagement element controlling section that performs an engagement-and-release control for the engagement element during a mode transfer between the continuously variable transmission gear ratio mode and the fixed transmission gear ratio mode;

a vehicle speed detecting section that detects a vehicle speed;

a target driving force calculating section that calculates a target driving force of the vehicle; and a mode area map setting section that sets, according to the vehicle speed and the target driving force, a steady-state area map including a continuously variable transmission gear ratio mode area, a fixed transmission gear ratio mode area, and an overlap area in which both of the continuously variable transmission gear ratio mode area and the fixed transmission gear ratio mode area are overlapped with each other, the mode selecting section, in a state in which the vehicle is in at least one of a start state and a travel state and in one steady-state mode of the continuously variable transmission gear ratio mode and the fixed transmission gear ratio mode, inhibiting a mode transfer to the other steady-state mode of the continuously variable transmission gear ratio mode and the fixed transmission gear ratio mode in a case where a driving point of the vehicle determined according to a detection value of the vehicle speed and a calculation value of the target driving force is present within the overlap area in the steady-state mode area map in which both of the continuously variable transmission gear ratio mode and the fixed transmission gear ratio mode are selectable.

2. A mode transfer control apparatus for a hybrid vehicle as claimed in claim 1, wherein the mode selecting section, in a state in which the vehicle is at least one of in the start state and in the travel state and in one of the continuously variable transmission gear ratio mode and the fixed transmission gear ratio mode, allows the mode transfer to the other of the continuously variable transmission gear ratio mode and the fixed transmission gear ratio mode only when the driving point of the vehicle is in excess of the area in which only the one mode is selectable on the steady-state mode area map.

3. A mode transfer control apparatus for a hybrid vehicle as claimed in claim 1, wherein the motor comprises a first motor/generator and a second motor/generator and the differential gear transmission includes a planetary gear train having two degrees of freedom and in which the power sources and an output member are linked to the revolutional elements in such a way that the first motor/generator, the engine, the output member, and the second motor/generator are aligned in a revolution speed order on a lever diagram and a low brake, disposed at a position between the output member and the second motor/generator on the lever diagram, to fix the transmission gear ratio to a predetermined low gear ratio when the low brake is engaged, the continuously variable transmission gear ratio mode is an electric vehicle mode in which the vehicle is started or traveled while achieving the continuously variable transmission ratio by the drive of only the first motor/generator and the second motor/generator, and the fixed transmission gear ratio is an electric vehicle-low brake mode in which the low brake is engaged to achieve the fixed transmission gear ratio and the vehicle is started or traveled by the drive of the first motor/generator and the second motor/generator.

4. A mode transfer control apparatus for a hybrid vehicle as claimed in claim 3, wherein the mode selecting section, in a state in which the mode selecting section selects the electric vehicle mode and in which the vehicle is started or traveled in the electric vehicle mode, does not transfer to any mode other than the electric vehicle mode unless the driving point of the vehicle is moved and in excess of the steady-state mode area in which only the electric vehicle mode is selectable on the steady-state area map.

5. A mode transfer control apparatus for a hybrid vehicle as claimed in claim 4, wherein the mode selecting section comprises:
a first electric vehicle mode determining section that determines whether a present driving point of the vehicle at a present time is present within an electric vehicle mode area on the steady-state mode area map enclosed by a maximum driving force line of the electric vehicle mode or within an electric vehicle-low brake mode area enclosed by another maximum driving force line of the electric vehicle-low brake mode or not; and
a flag state determining section that determines whether a flag representing whether the vehicle is started or traveled in the electric vehicle mode or in the electric vehicle-low brake mode is set to "1" when the first electric vehicle mode determining section determines that the present driving point of the vehicle is present within the electric vehicle mode area on the steady-state mode area map or within the electric vehicle-low brake mode area on the steady-state mode area map.

6. A mode transfer control apparatus for a hybrid vehicle as claimed in claim 5, wherein the mode selecting section further comprises:
an electric vehicle-low brake mode determining section that determines whether the present driving point of the vehicle at the present time is present within the electric vehicle-low brake mode area of the steady-state mode areas on the steady-state mode area map enclosed by the another maximum driving force line of the electric vehicle-low brake mode area when the flag state determining section determines that the flag is set to "1"; and
a second electric vehicle mode determining section that determines whether the present driving point of the vehicle at the present time is present within the electric vehicle mode area enclosed by the maximum driving force line of the electric vehicle mode when the flag state determining section determines that the flag is reset to zero or when the electric vehicle-low brake mode determining section determines that the present driving point of the vehicle at the present time is not present within the electric vehicle-low brake mode area enclosed by the another maximum driving force line of the electric vehicle-low brake mode on the steady-state mode map.

7. A mode transfer control apparatus for a hybrid vehicle as claimed in claim 6, wherein the mode selecting section further comprises:
a previous time electric vehicle-low brake mode determining section that determines whether the electric vehicle-low brake mode has been selected at a previous time when the electric vehicle-low brake mode determining section determines that the present driving point of the vehicle at the present time is present within the electric vehicle-low brake area enclosed by the another maximum driving force line or when the second electric vehicle mode determining section determines that the present driving point of the vehicle at the present time is not present within the electric mode area enclosed by the maximum driving force line of the electric vehicle mode on the steady-state mode area map; and
a previous time electric mode determining section that determines whether the electric vehicle mode has been selected at the previous time when the second electric vehicle mode determining section determines that the present driving point of the vehicle at the present time is present within the electric vehicle mode area enclosed by the maximum driving force line of the electric vehicle mode.

8. A mode transfer control apparatus for a hybrid vehicle as claimed in claim 7, wherein the mode selecting section further comprises:
an electric vehicle-low brake mode selecting section that selects that the vehicle is started or traveled in the electric vehicle-low brake mode with the low brake engaged and with the flag set to "1" when the previous time electric vehicle-low brake mode determining section determines that the electric vehicle-low brake mode has been selected at the previous time; and
an electric vehicle mode selecting section that selects that the vehicle is started or traveled in the electric vehicle mode with the low brake released and with the flag reset to "0" when the previous time electric vehicle mode determining section determines that the electric vehicle mode has been selected at the previous time.

9. A mode transfer control apparatus for a hybrid vehicle as claimed in claim 8, wherein the overlap area of both of the electric vehicle mode area and the electric vehicle-low brake mode area is present within the electric vehicle-low brake mode area enclosed by the another maximum driving force line of the electric vehicle-low brake mode area.

10. A mode transfer control apparatus for a hybrid vehicle, comprising:

power sources including an engine and at least one motor;
a differential gear transmission including a planetary gear train in which the respective power sources are linked with revolutional elements of the planetary gear train and at least one engagement element that is engaged to achieve a fixed transmission gear ratio from a state in which the engagement element is released to provide a continuously variable transmission function for the planetary gear train;
mode selecting means for selecting one steady-state mode from modes of a continuously variable transmission gear ratio in which the engagement element is released and a fixed transmission gear ratio in which the engagement element is engaged;
engagement element controlling means for performing an engagement-and-release control for the engagement element during a mode transfer between the continuously variable transmission gear ratio mode and the fixed transmission gear ratio mode;
vehicle speed detecting means for detecting a vehicle speed;
target driving force calculating means for calculating a target driving force of the vehicle; and
mode area map setting means for setting a steady-state area map including a continuously variable transmission gear ratio mode area, a fixed transmission gear ratio mode area, and an overlap area in which both of the continuously variable transmission gear ratio mode area and the fixed transmission gear ratio mode area are overlapped with each other according to the vehicle speed and the target driving force, the mode selecting means, in a state in which the vehicle is in at least one of a start state and a travel state and in one steady-state mode of the continuously variable transmission gear ratio mode area and the fixed transmission gear ratio mode area, inhibiting a mode transfer to the other steady-state mode of the continuously variable transmission gear ratio mode and the fixed transmission gear ratio mode in a case where a driving point of the vehicle determined according to a detection value of the vehicle speed and a calculation value of the target driving force is present within the overlap area in which both of the continuously variable transmission gear ratio mode and the fixed transmission gear ratio mode are selectable.

11. A mode transfer control method for a hybrid vehicle, the hybrid vehicle comprising:

power sources including an engine and at least one motor; and
a differential gear transmission including a planetary gear train in which the respective power sources are linked with revolutional elements of the planetary gear train and at least one engagement element that is engaged to achieve a fixed transmission gear ratio from a state in which the engagement element is released to provide a continuously variable transmission function for the planetary gear train, and the mode transfer control method comprising:
selecting one steady-state mode from modes of a continuously variable transmission gear ratio in which the engagement element is released and a fixed transmission gear ratio in which the engagement element is engaged;
performing an engagement-and-release control for the engagement element during a mode transfer between the continuously variable transmission gear ratio mode and the fixed transmission gear ratio mode;
detecting a vehicle speed;
calculating a target driving force of the vehicle; and
setting a steady-state area map including a continuously variable transmission gear ratio mode area, a fixed transmission gear ratio mode area, and an overlap area in which both of the continuously variable transmission gear ratio mode area and the fixed transmission gear ratio mode area are overlapped with each other according to the detected vehicle speed and the calculated target driving force, at the mode selection, in a state in which the vehicle is in at least one of a start state and a travel state and in one steady-state mode of the continuously variable transmission gear ratio mode area and the fixed transmission gear ratio mode area, a mode transfer to the other steady-state mode of the continuously variable transmission gear ratio mode and the fixed transmission gear ratio mode is inhibited in a case where a driving point of the vehicle determined according to a detection value of the vehicle speed and a calculation value of a target driving force is present within the overlap area in which both of the continuously variable transmission gear ratio mode and the fixed transmission gear ratio mode are selectable.

* * * * *